United States Patent [19]

Cunningham et al.

[11] 4,221,939
[45] Sep. 9, 1980

[54] METHOD AND APPARATUS FOR DETERMINING THE TUNED FREQUENCY OF A DIGITAL REPEATER

[75] Inventors: Peter B. Cunningham, Plaistow, N.H.; James C. Smith, Chicago, Ill.

[73] Assignee: Bell Telephone Laboratories, Incorporated, Murray Hill, N.J.

[21] Appl. No.: 36,455

[22] Filed: May 7, 1979

[51] Int. Cl.² .................. H04B 3/46; H04B 1/60
[52] U.S. Cl. ............................. 179/175.31 R
[58] Field of Search .......... 179/175.31 R, 175.3 R, 179/170 F, 15 BF; 340/146.1 R, 146.1 AB, 146.1 A, 146.1 E; 178/69 R, 69 A, 69 G; 328/164

[56] References Cited

U.S. PATENT DOCUMENTS

| | | | |
|---|---|---|---|
| 3,062,927 | 11/1962 | Hamori | 179/175.31 R |
| 3,678,222 | 7/1972 | Boehly | 179/175.31 R |
| 3,760,127 | 9/1973 | Camiciottoli et al. | 179/175.31 R |
| 3,764,760 | 10/1973 | Marchini | 179/175.31 R |
| 3,870,838 | 3/1975 | Corwin et al. | 179/175.31 R |
| 4,001,525 | 1/1977 | Edwards | 179/175.31 R |
| 4,022,988 | 5/1977 | Lentz et al. | 179/175.31 R |
| 4,112,263 | 9/1978 | Lender | 179/175.31 R |

*Primary Examiner*—Thomas A. Robinson
*Attorney, Agent, or Firm*—David R. Padnes

[57] ABSTRACT

An apparatus and method for determining the tuned frequency of a digital repeater (2) solely through the use of external connections. A pulse burst (30) at a preselected transmission frequency, produced by generator circuitry (4), is inserted into repeater (2) to cause the timing circuit of the same to oscillate for a predetermined time interval (25). After burst (30) and during interval (25), a plurality of sequential sampling pulses (26, 27) is fed to repeater (2) and regenerated by same. This format of burst (30) followed by sampling pulses (26, 27) is preferably repeated a number of times. Counter (10) measures the average time interval between the regenerated sampling pulses and determines the tuned frequency.

12 Claims, 6 Drawing Figures

GENERATOR OUTPUTS

METHOD AND APPARATUS FOR DETERMINING THE TUNED FREQUENCY OF A DIGITAL REPEATER

TECHNICAL FIELD

This invention relates to both a method and apparatus for determining the tuned frequency of a digital repeater wherein a digital pulse stream is supplied to the repeater and the tuned frequency determined from the time interval between preselected pulses that are regenerated by the repeater.

BACKGROUND OF THE INVENTION

Digital repeaters are presently manufactured in large volume for telecommunications applications. Present test methodologies involve the coupling of a pulse burst into the repeater to cause the timing circuit to oscillate. After the pulse burst, these oscillations are counted for a prescribed interval to determine the tuned frequency of the repeater. Counting of these oscillations, in general, requires internal access to the repeater circuitry and hence incurs the expense of repeater disassembly. In addition to this economic shortcoming, it is desirable for quality assurance reasons to determine the tuned frequency of a fully assembled repeater just prior to shipment. Measurement of the tuned frequency of a fully assembled repeater is also more accurate since it includes the parasitic effects of a metallic repeater enclosure.

SUMMARY OF THE INVENTION

The present frequency determination method consists of coupling a specific digital pulse stream at a preselected rate into the repeater under test. This preselected rate is generally the nominal transmission rate. In T1 Carrier Systems, for example, this rate is 1.544 MHz. Initially, the digital pulse stream comprises a bipolar pulse burst of sufficient density and duration to cause the repeater timing circuit to oscillate for a prescribed time interval. During the interval the timing circuit is oscillating, a set of sequential sampling pulses is inserted. Unless the timing circuit is grossly misadjusted, the entire pulse stream will be regenerated by the repeater. This sequence of a pulse burst followed by sampling pulses is preferably repeated a number of times. Measurement of the average time interval between the regenerated sequential sampling pulse provides ready computation of the tuned frequency.

The test set apparatus is comprised of a generator and a receiver. The generator produces, using combinational logic, the unique digital pulse stream described above and hereinafter. Within the receiver is a signal detector, buffer and range limiter. The signal detector and buffer drive a computing counter, while the range limiter disables said counter when the tuned frequency of the repeater departs from the nominal transmission frequency by more than a predetermined amount.

It is a feature of the present invention that the number of positive and negative pulses in the digital pulse stream are approximately equal to avoid low frequency shifting of the pulse stream base line.

It is another feature of the present invention that a set of sampling pulses are unipolar thereby eliminating regeneration time differences due to pulse polarity.

It is still another feature of the present invention that all measurements and connections can be made from externally available repeater connections.

DETAILED DESCRIPTION

Figure 1:
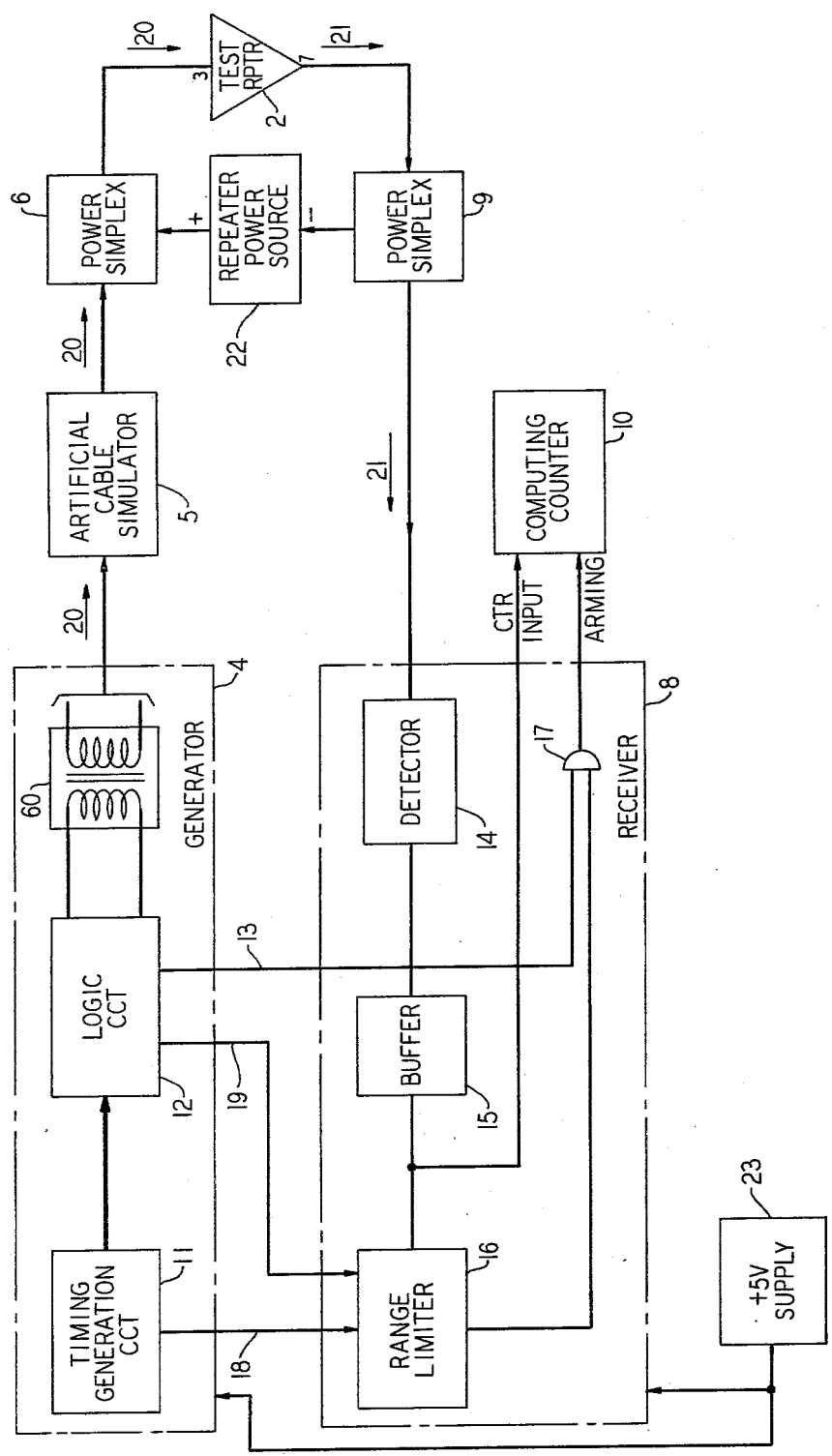
FIG. 1 shows a block diagram of the apparatus of the invention arranged for determining the tuned frequency of a digital repeater.

FIG. 1 shows the test apparatus and interconnections required for determining the tuned frequency of digital repeater 2. Input 3 of repeater 2 is connected to test set generator 4 via artificial cable simulator 5 and power simplex circuit 6. Output 7 from repeater 2 is connected to the test set receiver 8 via power simplex circuit 9. DC power from sources 22 and 23 is supplied respectively to repeater 2, via power simplex circuits 6 and 9, and to generator 4 and receiver 8.

Generator 4, using timing generation circuitry 11, logic circuitry 12 and output transformer 60, produces digital pulse stream 20 for determining the tuned frequency of the repeater. Pulse stream 20 is applied through artificial cable simulator 5 to repeater 2. Simulator 5 provides both a nominal amount of test signal loss to repeater 2 as well as the prescribed amount of test signal delay necessary for proper operation of test set receiver 8. Generator 4 also produces digital control signals, designated as arming pulses, which are supplied to computing counter 10 through interconnection lead 13 and AND gate 17. Receiver 8 contains a signal detector 14 and buffer 15 for coupling regenerated digital pulse stream 21 from repeater 2 to computing counter 10. Receiver section 8 also has a range limiter 16 which prevents erroneous readings by disabling counter 10 when a preset limit is exceeded. Limiter 16 compares the phase relationship between regenerated digital pulse stream 21 and a clock pulse produced by timing circuitry 11 during the pulse burst interval. The clock pulse is supplied to limiter 16 via interconnection 18. The output of limiter 16 controls AND gate 17, the latter allowing arming pulses 24 to pass to counter 10 and enable same if the repeater tuned frequency is within preset limits. If the tuned frequency is outside preset limits, AND gate 17 blocks pulses 24 thereby disabling counter 10. Interconnection 19 disables range limiter 16 during a measurement interval.

Computing counter 10 can be any one of several commercially available calculator controlled counters. One such counter found to be particularly suitable is a Hewlett-Packard Model 5360A.

Figure 2:
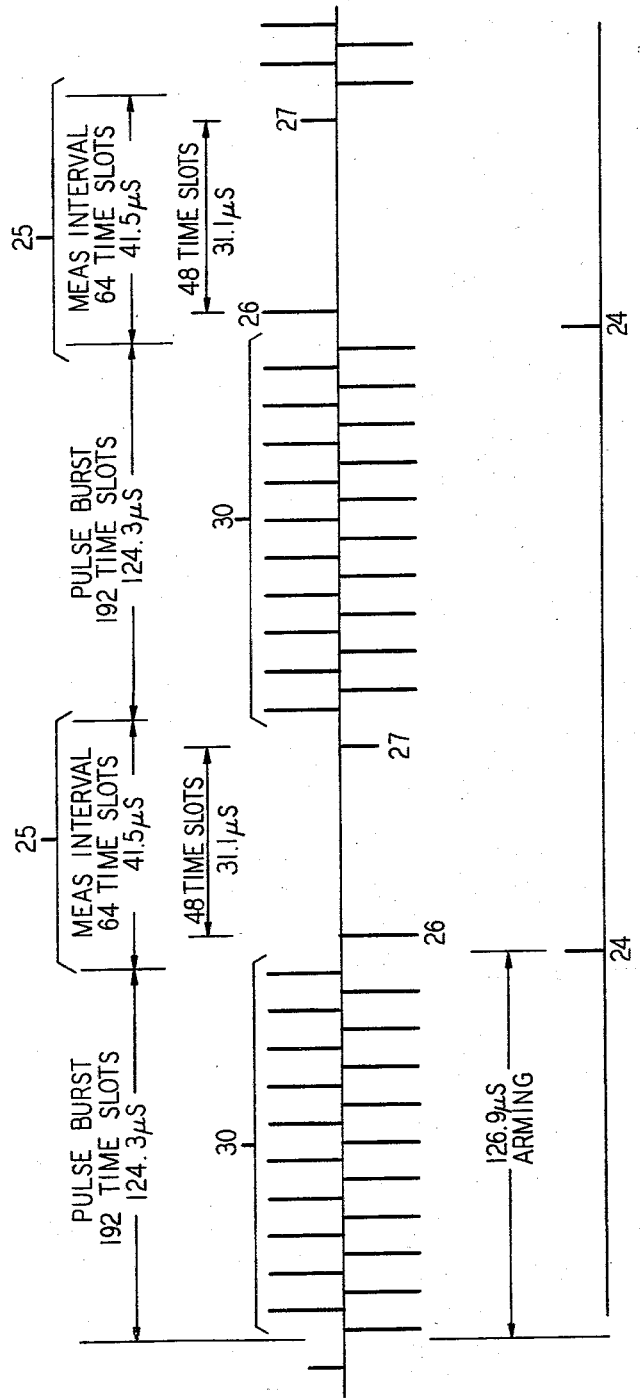
FIG. 2 shows a simplified timing diagram of the digital pulse stream used for determining the tuned frequency.

For the testing of T1 repeaters, generator 4 produces a digital pulse stream 20, shown in simplified form, in FIG. 2. Pulse stream 20 consists of a repetition of pulse burst 30 followed by sampling pulses 26, 27 wherein each pulse in stream 20 is synchronous with the T1 rate. Each pulse burst 30 is of sufficient density and duration to cause the repeater timing circuit to oscillate for a preselected time interval 25 without additional pulses.

In particular, the use of a 192 time slot (124.3 microseconds) burst 30 with all 1's pulses provided a measurement interval 25 of 64 time slots (41.5 microseconds). The designation "time slot" is a measurement of time equal to the reciprocal of the nominal transmission rate. During each measurement interval 25, two unipolar sampling pulses 26, 27 are inserted. The second sampling pulse 27 is advantageously of smaller amplitude and longer duration than first sampling pulse 26. The reasons for these alterations will be discussed infra. As shown, pulses 26, 27 are approximately centered in intervals 25 and are spaced 48 slots (31.1 microseconds) apart.

According to the features of the present invention, pulse burst 30 is bipolar and each pair of unipolar sampling pulses 26, 27 alternate in polarity, the polarity of any pair of sampling pulses 26, 27 being opposite to the polarity of the last pulse within burst 30. Such a format precludes the buildup of a d.c. offset voltage and the accompanying low frequency shift of the pulse stream 20 base line. Moreover, the use of unipolar sampling pulses 26, 27 within each measurement interval 25 avoids measurement errors caused by timing differences between the two logic rails in the pulse regenerator circuitry within a T1 repeater.

If the repeater 2 under test is tuned within reasonable limits, pulse stream 20 will be regenerated. Regenerated bipolar pulse stream 21 is fed into receiver 8 where stream 21 is converted into a unipolar format compatible with computing counter 10. Counter 10 is programmed and gated to measure only the time interval between the regenerated sampling pulses. This time interval is directly related to the frequency to which the repeater timing circuit is tuned. Specifically, if repeater 2 is exactly tuned to the rate of digital pulse stream 20, the timing circuit will oscillate at that frequency during interval 25 and the regenerated sampling pulses will be identical to their counterparts 26, 27. If, however, the timing circuit is mistuned by some amount, the timing circuit oscillations will slip to the mistuned frequency during a measurement interval 25. The amount of frequency slip will be reflected in a time change between the regenerated sampling pulses.

Generator 4 also produces arming pulses 24 within each measurement interval 25 to condition counter 10 to receive a pair of regenerated sequential sampling pulses. Arming pulses 24 are not fed to repeater 2 but instead are directly coupled from generator 4 to receiver 8. Pulses 24 stimulate counter 10 to begin counting upon the arrival of the first regenerated sampling pulses within each measurement interval 25. This count is continued until the arrival of the second regenerated sampling pulse. This counting process is preferably performed for a number of measurement intervals 25 and counter 10 is programmed to determine the tuned frequency from the average time between the regenerated first and second sampling pulses. Each arming pulse 24 is produced 196 time slots (126.9 microseconds) after the start of pulse burst 30.

It will of course be understood by those skilled in the art that the above digital pulse stream format may be altered for the testing of repeaters designed for other digital rates. It is important, however, that whatever the digital pulse stream rate, the rate should be synchronous with the nominal transmission rate of the repeater.

Figure 3:
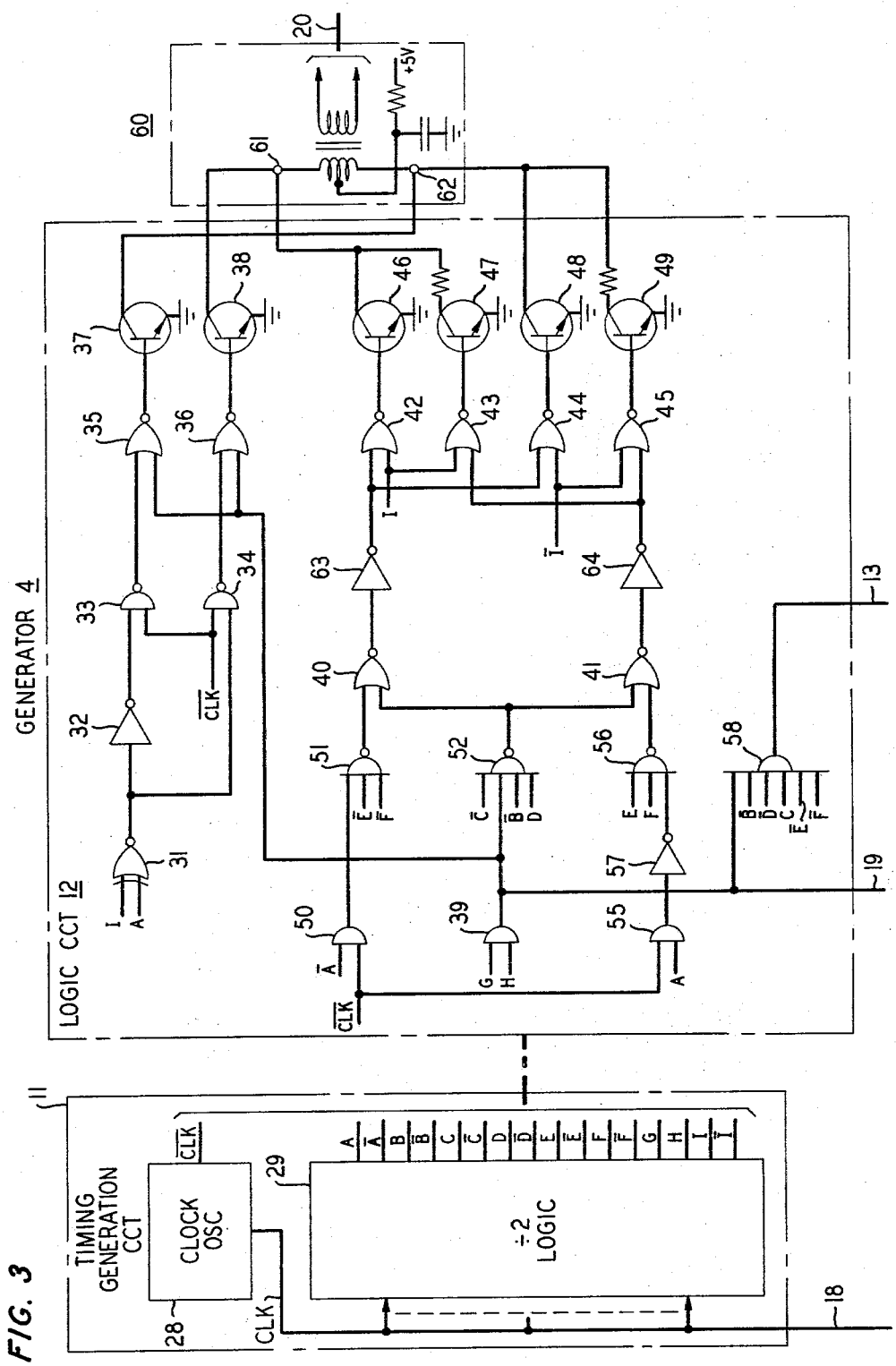
FIG. 3 is a schematic diagram of the test set generator which provides the pulse stream shown in FIG. 2.
Figure 4:
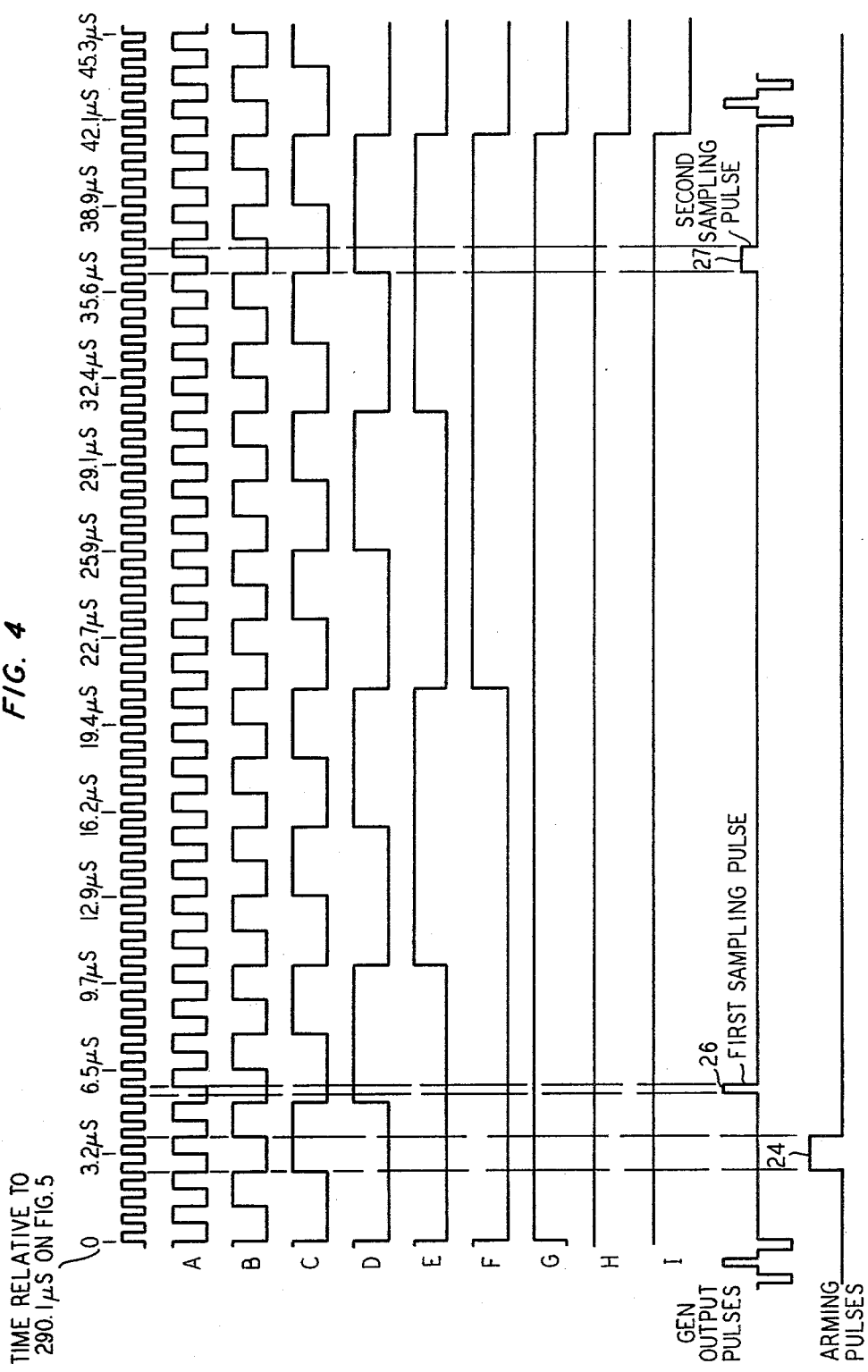
FIGS. 4 and 5 are detailed timing diagrams of the signals used in the generator of FIG. 3 to provide the pulse stream of FIG. 2.
Figure 5:
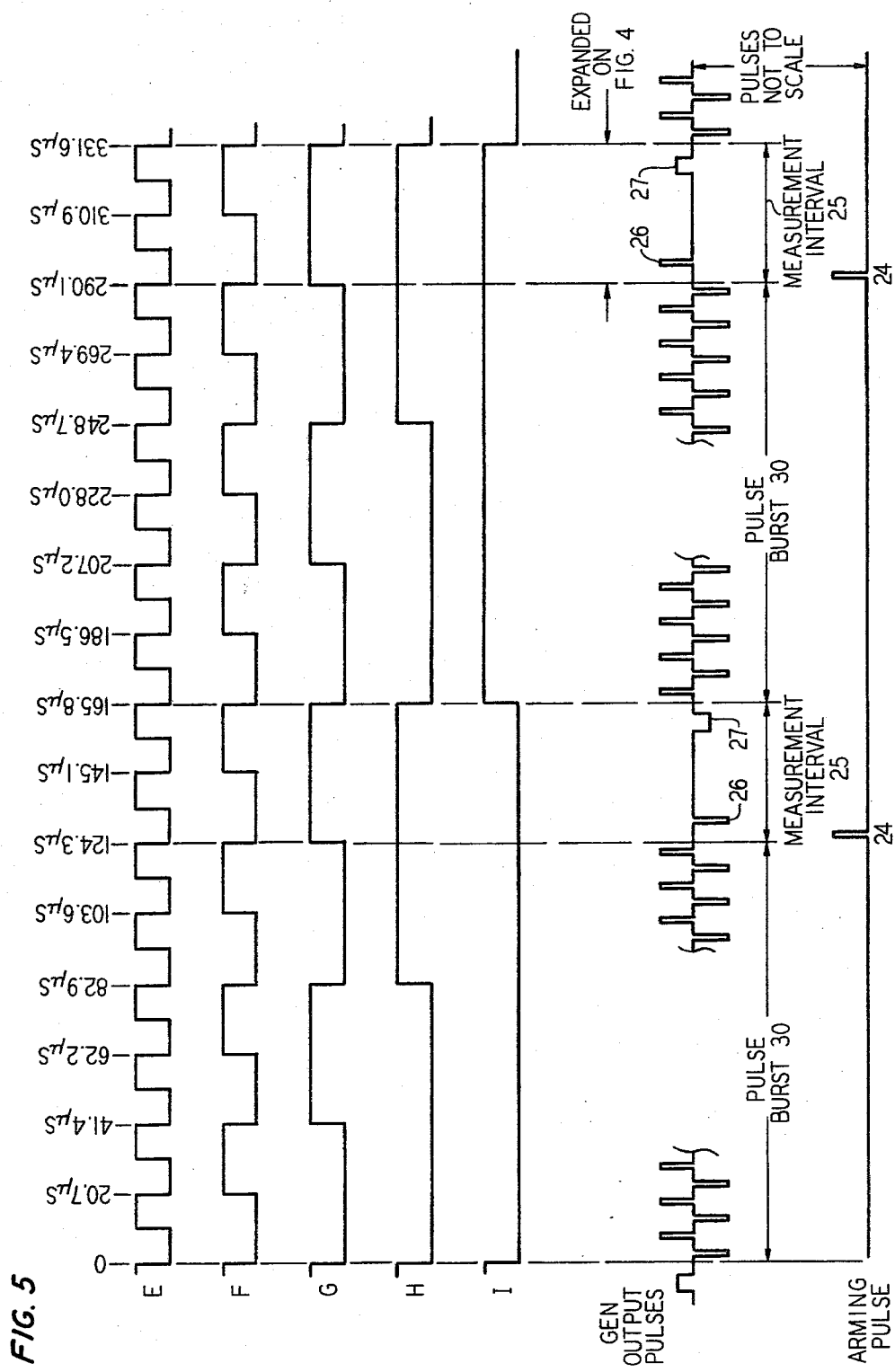

FIG. 3 illustrates the schematic of a generator for producing the digital pulse stream of FIG. 2. The timing and generation of each pulse is controlled by a pair of 1.544 MHz complementary clock pulses CLK, $\overline{CLK}$ along with a series of derived timing pulses designated as, A, $\overline{A}$, B, $\overline{B}$, C, $\overline{C}$, D, $\overline{D}$, E, $\overline{E}$, F, $\overline{F}$, G, H, I and $\overline{I}$. Timing diagrams of all timing pulses, along with a representation of the generated digital pulse stream, are shown in FIGS. 4 and 5. The generation of the digital pulse stream of FIG. 2 will now be examined in light of FIGS. 3, 4 and 5.

The generation of the clock and derived timing pulses is provided by a clock oscillator 28 and conventional divide by two logic 29 within timing generation circuitry 11. The bipolar all "1's" pulses are generated by exclusive NOR gate 31, inverter 32, NAND gates 33, 34, NOR gates 35 and 36 and transistors 37 and 38. For purposes of discussion, positive pulses are produced when pin 61 of output transformer 60 is pulsed and negative pulses are produced when pin 62 is pulsed. NOR gates 35 and 36 are alternately pulsed from $\overline{CLK}$ via NAND gates 33 and 34. The outputs of NOR gates 35 and 36, however, are gated off during measurement interval 25 by the output of AND gate 39. As depicted in FIG. 5, measurement interval 25 occurs when both timing signals G and H are "1's". An alternating sequence of $\overline{CLK}$ out of gates 33 and 34 is produced by the alternating phase of the A signal coupled into gates 33 and 34 via exclusive NOR gate 31 and inverter 32. The output of exclusive NOR gate 31 inverts the phase of the A lead as a function of the state of the I lead. This causes the polarity of each pulse within burst 30 to alternate in successive pulse bursts.

Sampling pulses 26, 27 are produced during interval 25 by NOR gates 40, 41, 42, 43, 44, 45, inverters 63 and 64 and transistors 46, 47, 48 and 49. Timing pulses I and $\overline{I}$ are coupled to gates 42, 43, 44 and 45 to alternately enable same to generate sampling pulses whose polarity alternates in successive measurement intervals.

First sampling pulse 26 is one time slot or one clock pulse width wide and is produced when a "1" occurs at the output of gate 40. This occurs when both inputs to gate 40 are "0". Logically combining pulses D, G, H and the complements $\overline{A}$, $\overline{B}$, $\overline{C}$, $\overline{E}$, $\overline{F}$ and $\overline{CLK}$, as performed by AND gates 39 and 50 and NAND gates 51 and 52, only produce simultaneous "0's" at the input of gate 40 for the position of pulse 26 as shown in FIGS. 4 and 5.

Second sampling pulse 27 is three time slots wide and is generated in a similar manner to first sampling pulse 26. Specifically, AND gate 39 and 55, NAND gates 52 and 56 along with inverter 57 produce a "1" at the output of NOR gate 41 for the duration of second sampling pulse 27 depicted in FIGS. 4 and 5.

The height of second sampling pulse 27 is lower than the height of first sampling pulse 26 to reduce the pulling effect of sampling pulse 27 on the timing circuit frequency. Reducing the height of pulse 27 above, however, limits the regeneration of pulse 33 by repeater 2 to a narrow band of timing circuit frequencies. Thus, the range of frequency measurement capability is reduced. To avoid this limitation, the width of second sampling pulse 27 is increased. The use of a second pulse 27 with a height of 1.1 volts, as opposed to the nominal 3 volt height for all other pulses in FIG. 2, and a width of 3 time slots provided satisfactory frequency measurements of ±4 KHz about the T1 transmission rate.

Arming pulse 24 is produced during each measurement interval 25 by AND gate 58. Referring to FIG. 4, logically combining derived timing pulses $\overline{B}$, $\overline{D}$, C, $\overline{E}$ and F̄ produces a "1" at the output of gate 58 only for the duration of pulse 24 as illustrated.

Figure 6:
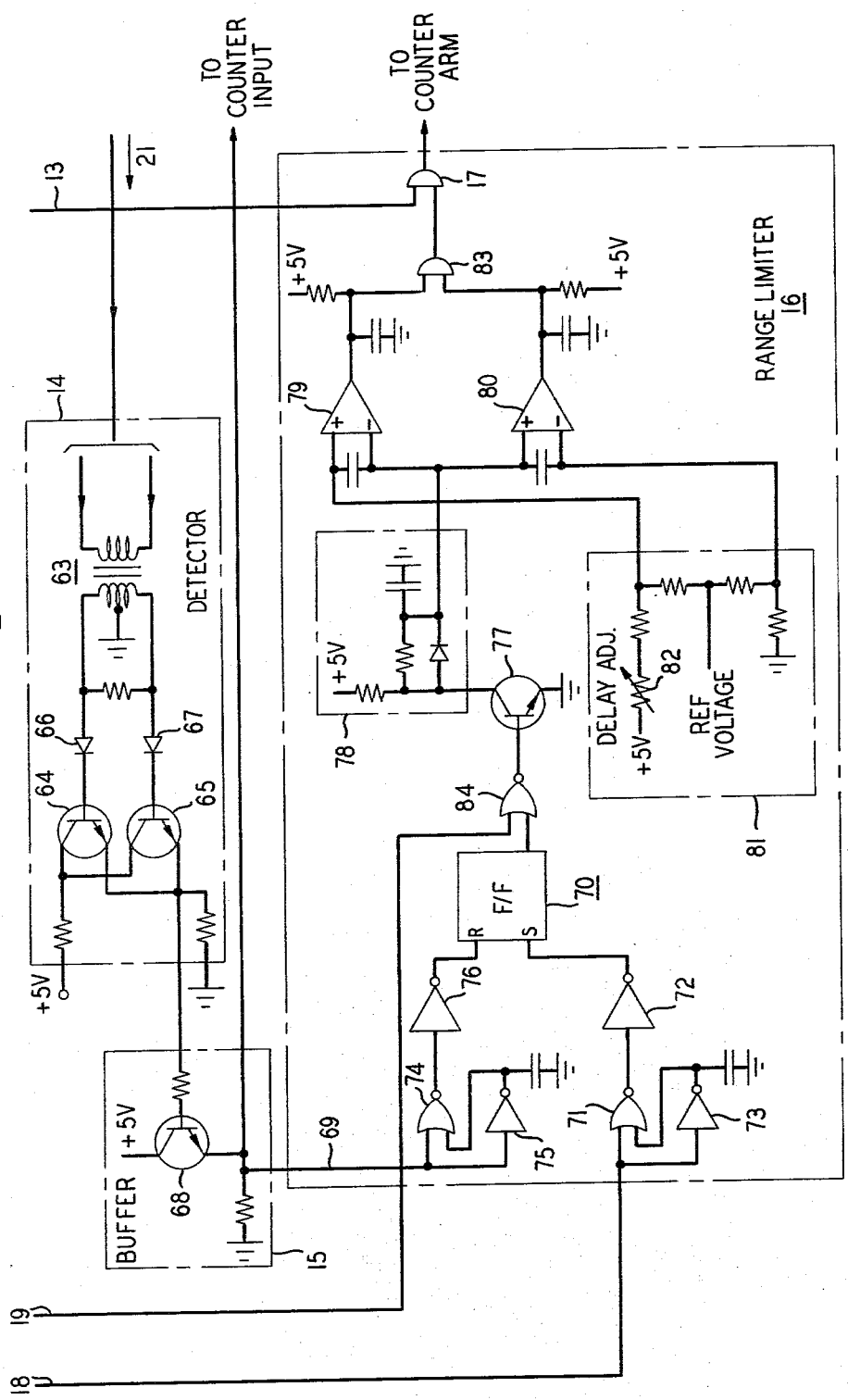
FIG. 6 is a schematic of the test set receiver.

The detailed schematic of receiver 8 is depicted in FIG. 6. Detector 14 and buffer 15 are required to couple the regenerated digital pulse stream 21 to counter 10. The turns ratio of transformer 63 should be selected so as to provide a regenerated pulse stream 21 with a sufficient signal level to drive counter 10. Transistors 64 and 65 provide full wave rectification of regenerated digital pulse stream 21. Diodes 66 and 67, connected to the bases of transistors 64 and 65, prevent reverse breakdown of the base emitter junctions of transistors 64 and 65.

Buffer 14, shown in block form in FIG. 2, is realized by transistor 68. Transistor 68 provides the necessary impedance to drive counter 10.

Range limiter 16 compares the phase relationship of the regenerated digital pulse stream 21 to the CLK signal produced by generator 4. These signals are supplied to limiter 16 via interconnections 69 and 18, respectively. The function of limiter 16 is to disable counter 10 to preclude erroneous frequency readings when testing T1 repeaters mistuned by more than a preselected amount. This disablement of counter 10 is necessitated by the tolerances of the T1 repeater circuitry. The timing circuit of a widely used T1 repeater in the communications network, for example, has a maximum tuning range of ±6 percent from the nominal 1.544 MHz frequency to compensate for component tolerances. Should the tuned frequency of a T1 repeater, however, depart from the nominal 1.544 MHz frequency by more than 4 KHz, it is possible for selected mistuned frequencies to regenerate sampling pulses that are 48 time slots apart. For example, if the timing circuit is mistuned to say 1512 KHz, then the 47th negative timing circuit clock transition can occur sufficiently close to second sampling pulse 27 to cause regeneration of said pulse 27. It is, therefore, possible for a grossly mistuned repeater to regenerate a pair of sampling pulses that counter 10 will interpret as a correctly tuned repeater. To avoid this result, range limiter 16 disables counter 10 when the repeater is mistuned by more than ±4 KHz.

The phase detector portion of limiter 16 consists of flip-flop 70. CLK transistions, via interconnection 18, are fed to NOR gate 71 and inverters 72, 73 to set flip-flop 70. The resetting of flip-flop 70 is achieved by the action of NOR gate 74 and inverters 75, 76 on the regenerated digital pulse stream 21, coupled via interconnection 69. Accordingly, the width of the output pulse from flip-flop 70 is proportional to the phase difference between CLK and regenerated digital pulse stream 21. NOR gate 84, controlled by generator 4 circuitry via interconnection 19, restricts the aforementioned phase comparisons to pulse burst intervals 30. During intervals 30, the output of flip-flop 70 is applied through to transistor 77 and filter circuit 78. Filter 78 produces a d.c. voltage proportional to the width of the output pulse from flip-flop 70. The time constant for filter 78 should be long enough to hold the generated d.c. voltage constant for the duration of each measurement interval 25.

As discussed, the delay between clock pulses CLK and the output of transistor 68 determines the nominal duty cycle of the pulse out of flip-flop 70. It was determined with a number of different, properly tuned widely used T1 repeaters that an artificial cable simulator 5 having a loss of 22.5 dB at 772 KHz produces an amount of delay (81 degrees at 772 KHz) to approximately yield a 50 percent duty cycle pulse out of flip-flop 70 and approximately a 2.5 volt d.c. out of filter circuit 78.

The d.c. voltage from filter 78 is applied to voltage comparators 79 and 80 both of which have open collector outputs. Comparator 79 determines the high frequency limit while comparator 80 establishes the low frequency limit. The cutoff limits are established by resistive voltage divider string 81. Centering of the cutoff limiter is advantageously provided by potentiometer 82. When the phase relationship between the received signal 21 and the CLK signal is within range, the output of comparator 79 and 80 are high or "1" and the output of AND gate 83 is a "1". This in turn allows the arming pulse 24, via interconnection 13, to pass through AND gate 17 to counter 10. When the phase relationship between the received signal 21 and the CLK signal is out of range, i.e., the T1 repeater is mistuned by more than ±4 KHz, the output of comparators 79 or 80 will be low or "0". The output of AND gate 83 will then be "0" and gate 17 will not pass arming pulse 24 to counter 10. As a result, counter 10 is disabled and will not display a reading unless the T1 repeater is tuned within ±4 KHz of the nominal frequency.

We claim:

1. A method of externally determining the tuned frequency of the timing circuit of a digital repeater (2) comprising the step of
    inserting a plurality of pulse bursts (30) into said repeater, each said burst being separated from one another, each said burst causing the timing circuit of said repeater to initially oscillate at the frequency of said burst and to continue oscillating after each said burst for a preselected measurement interval (25) at the tuned frequency of said timing circuit; and further CHARACTERIZED BY the steps of
    inserting a plurality of digital sampling pulses (26, 27) into said repeater during each said measurement interval when said timing circuit is oscillating at the tuned frequency, said sampling pulses within each said measurement interval being spaced a preselected time interval from one another, said sampling pulses being regenerated by said repeater,
    measuring the time interval between successive regenerated sampling pulses in each said measurement interval, and
    determining the tuned frequency of said timing circuit from the average time interval between successive sampling pulses from all of said measurement intervals.

2. The method of claim 1 wherein each said pulse burst comprises a repetition of binary "1" pulses with alternating polarity.

3. The method of claim 2 wherein each said plurality of digital sampling pulses (26, 27) within each said measurement interval (25) are unipolar.

4. The method of claim 3 wherein the polarity of each pulse in said burst (30) alternates in successive bursts.

5. The method of claim 4 wherein the polarity of said sampling pulses (26, 27) is opposite to the polarity of the last pulse in the immediately preceding burst (30).

6. The method of claim 5 wherein the second sampling pulse (27) has one-third the height and three times the width of first sampling pulse (26).

7. An apparatus for externally determining the tuned frequency of the timing circuit of a digital repeater (2)

comprising means for generating a plurality of pulse bursts (30), each said burst being separated from one another, and each said burst causing the timing circuit of said repeater to initially oscillate at the frequency of said burst and to continue to oscillate after each said burst for a preselected measurement interval (25) at the tuned frequency of said timing circuit; and further CHARACTERIZED BY
- means for generating a plurality of digital sampling pulses (26, 27) and for inserting the same into said repeater during each said measurement interval when said timing circuit is oscillating at the tuned frequency, said sampling pulses within each said measurement interval being spaced a preselected time interval from one another, said sampling pulses being regenerated by said repeater;
- means for measuring the time interval between successive regenerated sampling pulses in each said measurement interval, and
- means for determining the tuned frequency of said timing circuit from the average time interval between successive sampling pulses from all of said measurement intervals.

8. The apparatus of claim 7 wherein said means for generating said plurality of pulse bursts generates a repetition of "1's" pulses with alternating polarity.

9. The apparatus of claim 8 wherein said means for generating said plurality of digital sampling pulses generates unipolar pulses within each said measurement interval.

10. The apparatus of claim 9 wherein said pulse burst generating means generates each said pulse in said burst with alternating polarity in successive bursts.

11. The apparatus of claim 10 wherein said sampling pulse generating means generates said sampling pulses with a polarity opposite to the last pulse in the immediately preceding pulse burst.

12. The apparatus of claim 11 wherein said sampling pulse generating means generates second sampling pulse (27) with one-third the height and three times the width of first sampling pulse (26).

* * * * *